(12) United States Patent
Webber et al.

(10) Patent No.: US 7,654,561 B2
(45) Date of Patent: Feb. 2, 2010

(54) INFLATABLE CUSHION FOR AN AIRBAG MODULE

(75) Inventors: James L. Webber, Shelby Township, MI (US); Hyun-Ho Park, Bloomfield Hills, MI (US); Ryan T. Pinsenschaum, Dayton, OH (US); Laura A. Hawthorn, Tipp City, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/040,886

(22) Filed: Mar. 1, 2008

(65) Prior Publication Data

US 2009/0218796 A1 Sep. 3, 2009

(51) Int. Cl.
*B60R 21/16* (2006.01)

(52) U.S. Cl. ...................... 280/729; 280/739

(58) Field of Classification Search ................. 280/729, 280/736, 737, 739
See application file for complete search history.

(56) References Cited

U.S. PATENT DOCUMENTS

| | | | | |
|---|---|---|---|---|
| 3,642,303 A | * | 2/1972 | Irish et al. ................. | 280/730.1 |
| 4,169,613 A | * | 10/1979 | Barnett ........................ | 280/732 |
| 4,262,931 A | * | 4/1981 | Strasser et al. ............... | 280/729 |
| 5,240,283 A | * | 8/1993 | Kishi et al. .................. | 280/729 |
| 5,308,113 A | * | 5/1994 | Moriset ..................... | 280/743.2 |
| 5,529,337 A | * | 6/1996 | Takeda et al. ................ | 280/729 |
| 6,419,262 B1 | * | 7/2002 | Fendt et al. .................. | 280/729 |
| 6,554,313 B2 | * | 4/2003 | Uchida ........................ | 280/729 |
| 6,773,027 B2 | * | 8/2004 | Bohn et al. .................. | 280/729 |
| 6,851,706 B2 | * | 2/2005 | Roberts et al. ............ | 280/730.1 |
| 6,971,664 B2 | * | 12/2005 | Amamori ..................... | 280/729 |
| 7,134,691 B2 | * | 11/2006 | Dunkle et al. ............. | 280/743.2 |
| 7,192,050 B2 | * | 3/2007 | Sato et al. ..................... | 280/729 |
| 7,210,701 B2 | * | 5/2007 | Meissner et al. ............. | 280/729 |
| 2005/0098985 A1 | * | 5/2005 | Sullivan et al. ............. | 280/729 |

* cited by examiner

*Primary Examiner*—Faye M. Fleming
(74) *Attorney, Agent, or Firm*—Thomas N. Twomey (57) ABSTRACT

An inflatable cushion for use in an airbag module is provided. The inflatable cushion generally includes a primary inflatable chamber configured for deployment from the air bag module, the primary inflatable chamber having an inlet opening for receipt of an inflation gas and the primary inflatable chamber defines a first volume. A secondary inflatable chamber secured to the primary inflation chamber, the secondary inflatable chamber defining a second volume, the second volume being less than the first volume and the secondary inflatable chamber being in fluid communication with the primary inflatable chamber such that the inflation gas must travel through the primary inflatable chamber prior to reaching the secondary inflatable chamber.

13 Claims, 5 Drawing Sheets

FIG. 7

INFLATABLE CUSHION FOR AN AIRBAG MODULE

BACKGROUND

Exemplary embodiments of the present invention relate generally to airbags or inflatable cushions. More specifically, exemplary embodiments of the present invention relate to systems and methods for deploying a two-chamber inflatable cushion from an airbag module in a gas-efficient manner.

Passenger side airbags or inflatable cushions have historically been designed as a single chamber cushion for restraining both the head and chest of a belted or unbelted occupant during a predetermined event. Because the head and chest of the occupant have different masses, each are restrained at different rates by a single chamber cushion.

Accordingly, it is desirable to provide an inflatable cushion and/or system for providing an inflatable cushion capable of providing differing amounts of support or cushion reaction to various portions of a vehicle occupant while also reducing the amount of gas needed for deploying a passenger airbag.

SUMMARY OF THE INVENTION

Thus in accordance with exemplary embodiments of the present invention there is provided an airbag module or system including a two-chamber inflatable cushion that operates in a gas-efficient manner.

In one exemplary embodiment, an inflatable cushion for use in an airbag module is provided. The inflatable cushion generally includes a primary inflatable chamber configured for deployment from the air bag module, the primary inflatable chamber having an inlet opening for receipt of an inflation gas and the primary inflatable chamber defines a first volume. A secondary inflatable chamber is secured to the primary inflation chamber, the secondary inflatable chamber defining a second volume, the second volume being less than the first volume and the secondary inflatable chamber being in fluid communication with the primary inflatable chamber such that the inflation gas must travel through the primary inflatable chamber prior to reaching the secondary inflatable chamber.

In another exemplary embodiment, an inflatable cushion for use in an air bag module is provided. The inflatable cushion comprising: a primary inflatable chamber configured for deployment from the air bag module, the primary inflatable chamber having an inlet opening for receipt of an inflation gas, the primary inflatable chamber defining a first volume; and a secondary inflatable chamber secured to the primary inflation chamber, the secondary inflatable chamber defining a second volume the second volume being less than the first volume, the secondary inflatable chamber receiving the inflation gas from the primary inflation chamber through a portion of the primary inflatable chamber that is surrounded by an inlet opening of the secondary inflatable chamber, the portion of the primary inflatable chamber being configured such that the inflation gas must travel into the primary inflatable chamber and create a first predetermined pressure in the primary chamber prior to the inflation gas passing through the portion and into the secondary inflatable chamber.

In another exemplary embodiment, an airbag module is provided the airbag module comprising: a housing portion; an inflatable cushion for deployment from the housing portion, the inflatable cushion having a primary inflatable chamber configured for deployment from the air bag module, the primary inflatable chamber having an inlet opening for receipt of an inflation gas, the primary inflatable chamber defining a first volume; and a secondary inflatable chamber secured to the primary inflation chamber, the secondary inflatable chamber defining a second volume the second volume being less than the first volume, the secondary inflatable chamber receiving the inflation gas from the primary inflation chamber through a portion of the primary inflatable chamber that is surrounded by an inlet opening of the secondary inflatable chamber, the portion of the primary inflatable chamber being configured such that the inflation gas must travel into the primary inflatable chamber and create a first predetermined pressure in the primary chamber prior to the inflation gas passing through the portion and into the secondary inflatable chamber. The airbag module further comprising an inflator for providing the inflation gas.

In still another exemplary embodiment, a method for deploying an inflatable cushion of an airbag module, the method comprising: inflating a primary inflatable chamber of the inflatable cushion with an inflating gas released from an inflator in fluid communication with the primary inflatable chamber, the primary inflatable chamber defining a first volume; and inflating a secondary inflatable chamber of the inflatable cushion by venting a portion of the inflating gas in the primary inflatable chamber into the secondary inflatable chamber after the primary inflatable chamber has been inflated to a predetermined pressure, the secondary inflatable chamber defining a second volume, the first volume being greater than the second volume.

DETAILED DESCRIPTION OF EXEMPLARY EMBODIMENTS

Exemplary embodiments of the present invention are directed to a passenger side airbag module (PAB) or an airbag system, and more particularly to an airbag system that includes a two-chamber inflatable cushion that operates in a gas-efficient manner wherein gas management is achieved through chambering and gas reuse.

Figure 1:
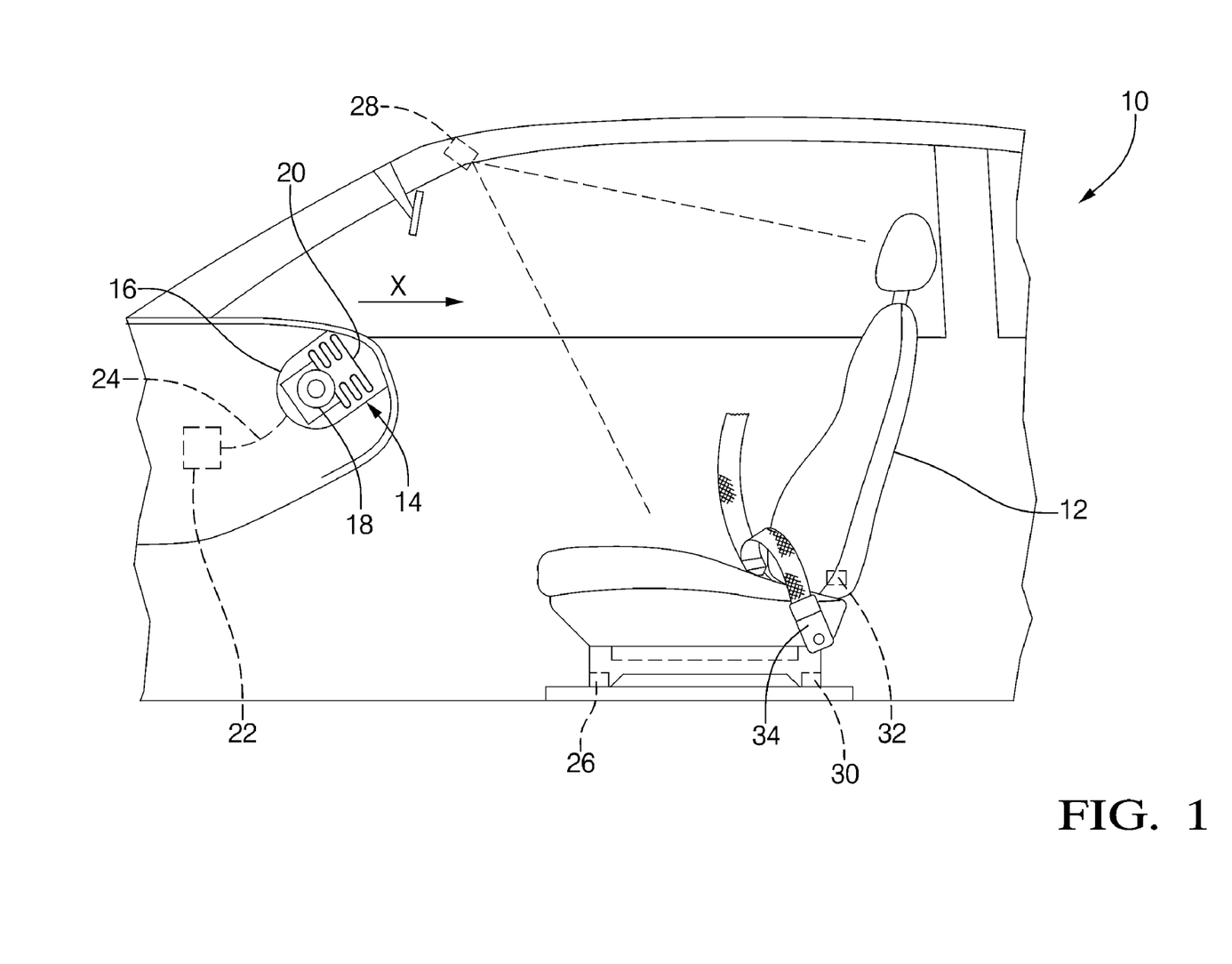
FIG. 1 illustrates a portion of a vehicle interior with an airbag module in accordance with an exemplary embodiment of the present invention.

Referring now to FIG. 1, a portion of an interior of a vehicle 10 is illustrated. Within the interior compartment of vehicle 10 is seating structure 12 and an airbag module 14 disposed in a selected spatial relationship with respect to seating structure 12. In one exemplary embodiment, the airbag module 14 comprises a housing 16, an inflator 18, and an inflatable cushion or airbag 20. The airbag module 14 is positioned within vehicle 10 for deployment of inflatable cushion 20 towards the seating structure 12.

The housing 16 of the airbag module 14 is mounted to or mounted proximate to an instrument panel or interior surface of vehicle 10 by suitable means such as fasteners. Of course, the housing 16 is contemplated for mounting to other structures in the vehicle. The housing 16 is made of an easily molded or extruded rigid material such as plastic, steel, aluminum, etc. The housing 16 includes an opening or door (not shown) in which the inflatable cushion 20 is deployed outwardly from. Alternatively, the opening or door is located within a portion of the instrument panel covering the housing of the airbag module. As will be discussed in more detail, the inflatable cushion 20 deploys away from the airbag module 14 generally in the direction of arrow X as well as other directions and typically deploys towards seating structure 12. During deployment, the door of the housing and/or the instrument panel is pushed away or moved in a manner such that inflatable cushion 20 has an unobstructed deployment.

The inflator is secured to or within the confines of housing 16 by a suitable means such as a fastener. The inflator 18 operates to provide the inflatable cushion 20 with an inflating gas. In one exemplary embodiment, the inflator 18 includes an igniter (not shown) for initiating a rapid chemical reaction for generating primarily nitrogen gas to fill and deploy cushion 20. It should be understood that other suitable inflating gases or gas generating materials can be used to fill and deploy cushion 20. It should be further understood that known inflator technologies can be used in accordance with an exemplary embodiment of the present invention such as single stage inflators and dual stage inflators.

A sensor or sensing-and-diagnostic module 22 is in signal communication with airbag module 14, and more particularly, with inflator 18. The sensing-and-diagnostic module 22 is adapted to detect an activation event wherein the occurrence of a threshold event will cause an activation signal 24 to be generated and received by the inflator 18, thereby causing the inflator 18 to inflate or deploy the inflatable cushion 20. The detection of the threshold event is determined by one or more sensors that are disposed about the vehicle 10 in accordance with known technologies. Thus, the activation signal 24 controls the activation of the airbag module 14.

In an exemplary embodiment, sensing-and-diagnostic module 22 comprises a microprocessor, microcontroller or other equivalent processing device capable of executing commands of computer readable data or program for executing a control algorithm that controls the operation of the airbag module 14. In order to perform the prescribed functions and desired processing, as well as the computations therefore (e.g., the execution of fourier analysis algorithm(s), the control processes prescribed herein, and the like), the controller may include, but not be limited to, a processor(s), computer (s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present invention can be implemented through computer-implemented processes and apparatuses for practicing those processes.

In addition, and in accordance with the alternative exemplary embodiments of the present invention, the sensing-and-diagnostic module can also be adapted to detect one or more conditions.

For example, the sensing-and-diagnostic module can receive inputs from one or more sensors such as, but not limited to, a seat position sensor 26, an optical scanner 28, a load sensor 30, a seat recline sensor 32, a seat belt use detection sensor 34, and a belt tensioning sensor (not shown).

Figure 2:
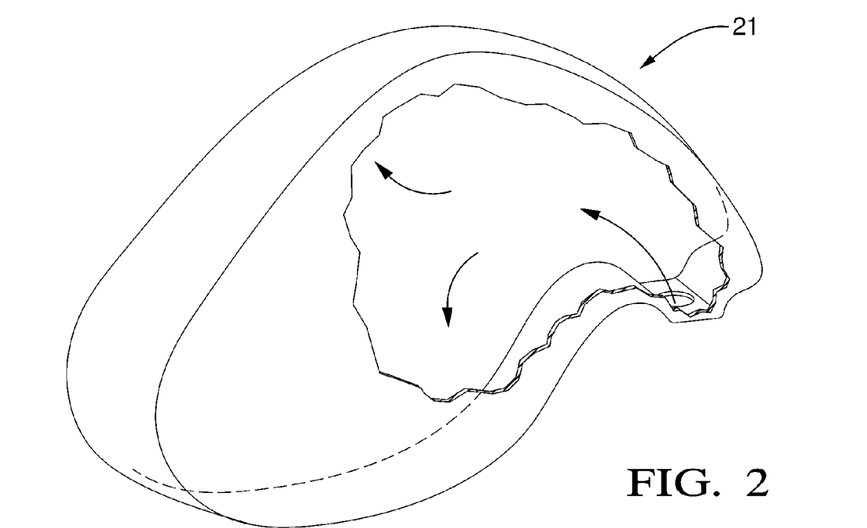
FIG. 2 is a perspective view of a baseline or single chamber inflatable cushion.
Figure 3:
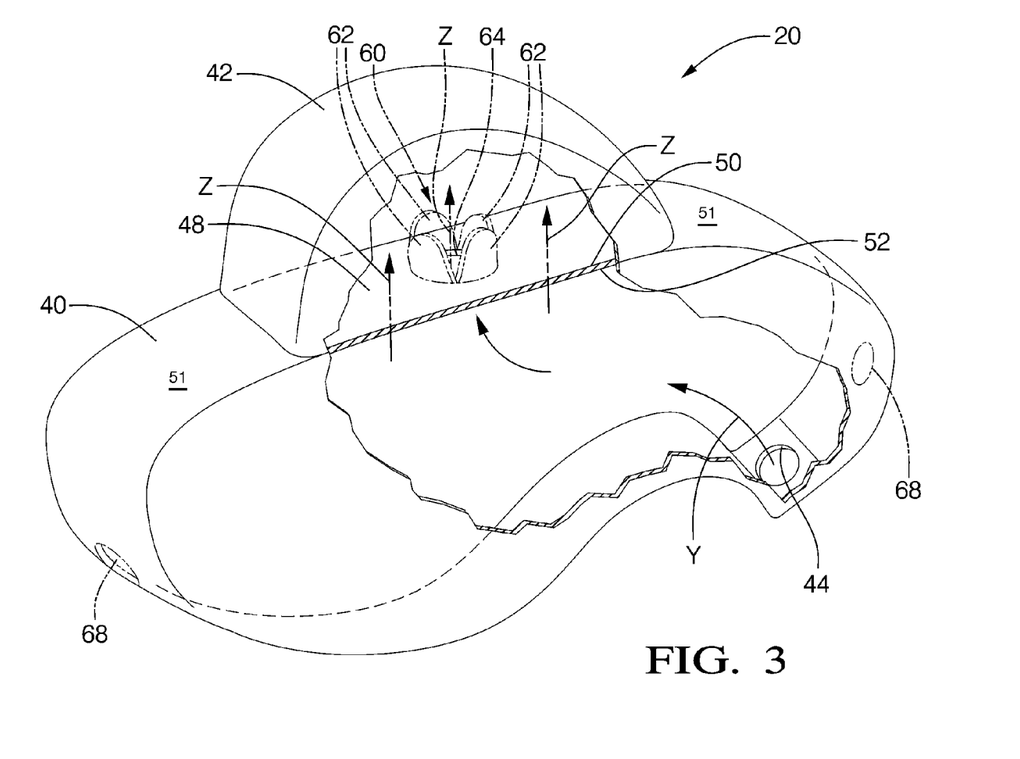
FIG. 3 is a perspective view of an inflatable cushion constructed in accordance with an exemplary embodiment of the present invention.

FIG. 2 illustrates a baseline or single chamber inflatable cushion 21, which will be used for comparison purposes when discussing the multiple chamber cushion of exemplary embodiments of the present invention. Referring now to FIG. 3, the inflatable cushion 20 includes a first chamber or chest chamber or primary inflation chamber 40 and a second chamber or head chamber or secondary inflatable chamber 42 in fluid communication with the primary inflation chamber 40 when the same has been inflated to a predetermined pressure. In one non-limiting exemplary embodiment, the predetermined pressure is approximately 20 KPa. See the graph of FIG. 4 at time 60, wherein the pressure of the secondary inflatable chamber begins to increase. Of course, other pressures greater or less than the aforementioned value are considered to be within the scope of exemplary embodiments of the present invention. FIG. 3 illustrates the inflatable cushion in a fully deployed state. The primary inflatable chamber 40 and secondary inflatable chamber 42 are designed to restrain a first region (e.g., chest) and a second region (e.g., head) of the occupant respectively. The inflatable cushion 20 is positioned to be in fluid communication with inflator 18 by an opening 44 in the primary inflatable chamber. More specifically, opening 44 provides fluid communication between inflator 18 and primary inflatable chamber 40. Thus, a path 46 is defined between inflator 18 and primary inflatable chamber 40, whereby the inflating gas generated by inflator 18 for deploying inflatable cushion 20 flows through a path generally in the direction of arrow Y. Preferably, the opening 44 is defined in a bottom surface of primary inflatable chamber 40 near inflator 18.

The primary inflatable chamber 40 and secondary inflatable chamber 42 are each formed from a fabric, such as a nylon fabric arranged into an inflatable bag. In one exemplary embodiment, the primary inflation chamber and/or the secondary inflation chamber further comprises small vent holes that allow the inflation gas to be slowly expelled from the bag as the occupant pushes against it. Other suitable known inflatable fabrics can be used to construct primary inflatable chamber 40 and secondary inflatable chamber 42 and should not be limited to the one described above. In one exemplary embodiment, the primary inflatable chamber 40 is designed to be less permeable than the secondary inflatable chamber 42. This is accomplished by thinly coating the primary inflatable chamber 40 with coatings of compounds such as neoprene, silicones and the like that are generally utilized to provide low permeability. As such, the primary inflatable chamber 40 exhibits a low leak-down time. In other words, gas expels from the primary inflatable chamber 40 at a slower rate than from secondary inflatable chamber 42 with no coatings. Other suitable compounds for providing low permeability can be coated onto the primary inflatable chamber 40 and should not be limited to the compounds described above.

In accordance with one non-limiting exemplary embodiment, the primary inflatable chamber 40 is designed to provide a volume of approximately eighty liters at full inflation or deployment and the secondary inflatable chamber 42 is designed to provide a volume of approximately fifteen liters at full inflation or deployment. The size of the primary inflatable chamber and secondary inflatable chamber in combination is relatively smaller than the size of a conventional single inflatable cushion which in average provides a volume of approximately 110 liters at full inflation or deployment. Thus, the primary inflatable chamber 40 is approximately twenty-seven percent smaller than the baseline cushion or conventional cushion, thereby requiring less gas to fill and then the gas is reused to inflate the secondary inflatable chamber. The primary inflatable chamber and secondary inflatable chamber can be of any combination of sizes depending on the application, preferably less than the size of a conventional single inflatable cushion, and should not be limited to the size combination described above.

In accordance with one exemplary embodiment of the present invention, a portion 48 of the primary inflatable chamber is selectively located to correspond to an opening into the secondary inflatable chamber wherein the secondary inflatable chamber is secured to the primary inflatable chamber proximate to portion 48, thereby forming inflatable cushion 20 as illustrated in FIG. 3. Portion 48 has a top face or exterior 50 and a bottom face or interior surface 52.

In accordance with an exemplary embodiment of the present invention portion 48 is formed from a fabric material (e.g. nylon or the like) and can be of any size depending on the opening of secondary inflatable chamber 42. In one exemplary embodiment, portion 48 comprises the same material as the primary inflatable chamber however portion 48 is not coated as opposed to other surfaces of the primary inflatable chamber and thus portion 48 is more permeable than exterior surfaces of the primary inflatable chamber not located within the opening of the secondary inflatable chamber.

In one non-limiting exemplary embodiment, other areas exclusive of portion 48 of the primary inflatable chamber are coated with a coating 51 or compounds such as neoprene, silicones and the like that are generally utilized to provide low permeability. Thus, during deployment, inflating gas from the primary inflatable chamber 40 will ultimately flow through portion 48 and into the secondary inflatable chamber 42. Accordingly and since the portion 48 is uncoated the portion 48 is used to regulate the flow of inflation gases into the secondary inflation chamber until a predetermined or desired pressure is reached within the primary inflation chamber. For example, the non-limiting example of 20 KPa mentioned above is used to design the permeability of portion 48.

In one exemplary embodiment, the primary inflatable chamber is configured to hold the inflating gases until a predetermined pressure is reached within the primary inflatable chamber thereafter and as the pressure increases from the predetermined pressure the gas will then vent through portion 48 and inflate the secondary inflatable chamber. As such, gas flows from the primary inflatable chamber into the secondary inflatable chamber generally in the direction of arrow Z. Thus, gas required to fully inflate the primary inflatable chamber 40 is recycled to fully inflate the secondary inflatable chamber 42. In other words, the gas needed to fill the secondary inflatable chamber 40 is vented from the primary inflatable chamber 40. As such, the same gas supply is used twice for occupant restraint. This provides a gas-efficient way of deploying cushion 20.

In one alternative exemplary embodiment and as illustrated by the dashed lines in FIG. 3, a vent or a plurality of vents 60 is/are located on portion 48 to allow venting of inflation gases from the primary inflatable chamber into the secondary inflatable chamber wherein the vent opens when the pressure within the primary inflatable chamber exceeds a predetermined value. Again, a non-limiting example would be the 20 KPa mentioned above of course, other pressures are contemplated. Here the vents are positioned on portion 48, which in this embodiment may be more permeable than other portions of the primary inflatable cushion or in another alternative exemplary embodiment, portion 48 will have the same permeability as other portions of the primary inflatable cushion. Of course, numerous configurations are contemplated to be within the scope of exemplary embodiments of the present invention as long as the desired flow rates are achieved at the desired pressures. In one non-limiting exemplary embodiment vent 60 is a petal vent comprising a plurality of petals or members 62 that cover an opening 64 in portion 48 and when the pressure in the primary inflatable chamber exceeds a predetermined level the petals or members unfurled or deploy to the configuration illustrated in FIG. 3 and opening 64 is uncovered. In addition, and in yet another alternative exemplary embodiment and if the pressure in the secondary inflatable chamber 42 exceeds that of the primary inflatable chamber the petals or members 62 are configured to limit flow from the secondary inflatable chamber back into the primary inflatable chamber when the pressure in the secondary chamber is greater than the first chamber and the gas flow is in the opposite direction to arrow Z thereby limiting gas transfer from the secondary inflatable chamber to the primary inflatable chamber after the secondary chamber has been inflated.

In yet another alternative exemplary embodiment, the primary inflatable chamber can also be configured to have a plurality or at least one vent 68 that allows some of the inflation gas of the primary inflatable chamber to be vented directly out from the chamber. Vent or vents 68 can be used in conjunction with vent 60 or the cushion may only have either one of vent 60 or 68. Similarly and in yet another alternative embodiment, a vent or vents may be disposed in the secondary inflatable chamber thus, the pressure in the secondary or head chamber and the primary or chest chamber can be discretely controlled by the number size and type of vents or lack thereof selected for each of the chambers.

The inflatable cushion having a two-chamber (primary inflatable chamber 40 and secondary inflatable chamber 42) design as described herein restrains the occupant with approximately forty percent less gas than a convention inflatable cushion. Thus, a single stage inflator instead of a dual stage inflator is employed in one exemplary embodiment, thus decreasing or minimizing the size, weight, and potentially the cost of the airbag module and restraint system. This reduction in gas usage helps meet low risk airbag requirements (e.g. unbelted FMVSS 208) as the total energy released in a deployment is reduced by approximately forty percent.

In one exemplary embodiment, the pressure in the primary inflatable chamber 40 is controlled by the selection of the inflator output and the vent size to the secondary chamber, which in some embodiments is the area of portion 48 disposed between the two chambers. The pressure in the secondary inflatable chamber 42 is also controlled by the size and number of vents 68, which are the vents defined by the nylon bag used to form primary inflatable chamber. This allows the chest and head pressures to be separately controlled for optimal restraint of the two body regions (chest and head). Vent sizes or the amount of vents of the primary inflatable chamber and the secondary inflatable chamber can be any size or number depending on the application.

In one exemplary embodiment, the chamber peak pressure in the primary inflatable chamber 40 during deployment can reach approximately 67 KPa while the chamber peak pressure in the secondary inflatable chamber during deployment can reach approximately 56 KPa. A conventional single inflator typically reaches approximately 40 KPa in peak pressure in a conventional single chamber cushion as mentioned above. As such, the two-chamber design as described above has approximately a sixty-seven percent increase in peak pressure over the baseline cushion namely 16 KPa in the secondary and 27 KPa in the primary. Moreover, and as will be discussed below these higher peak pressures are also achieved by using approximately 40% less inflation force than that which was required for the baseline cushion illustrated in attached Figures.

Figure 4:
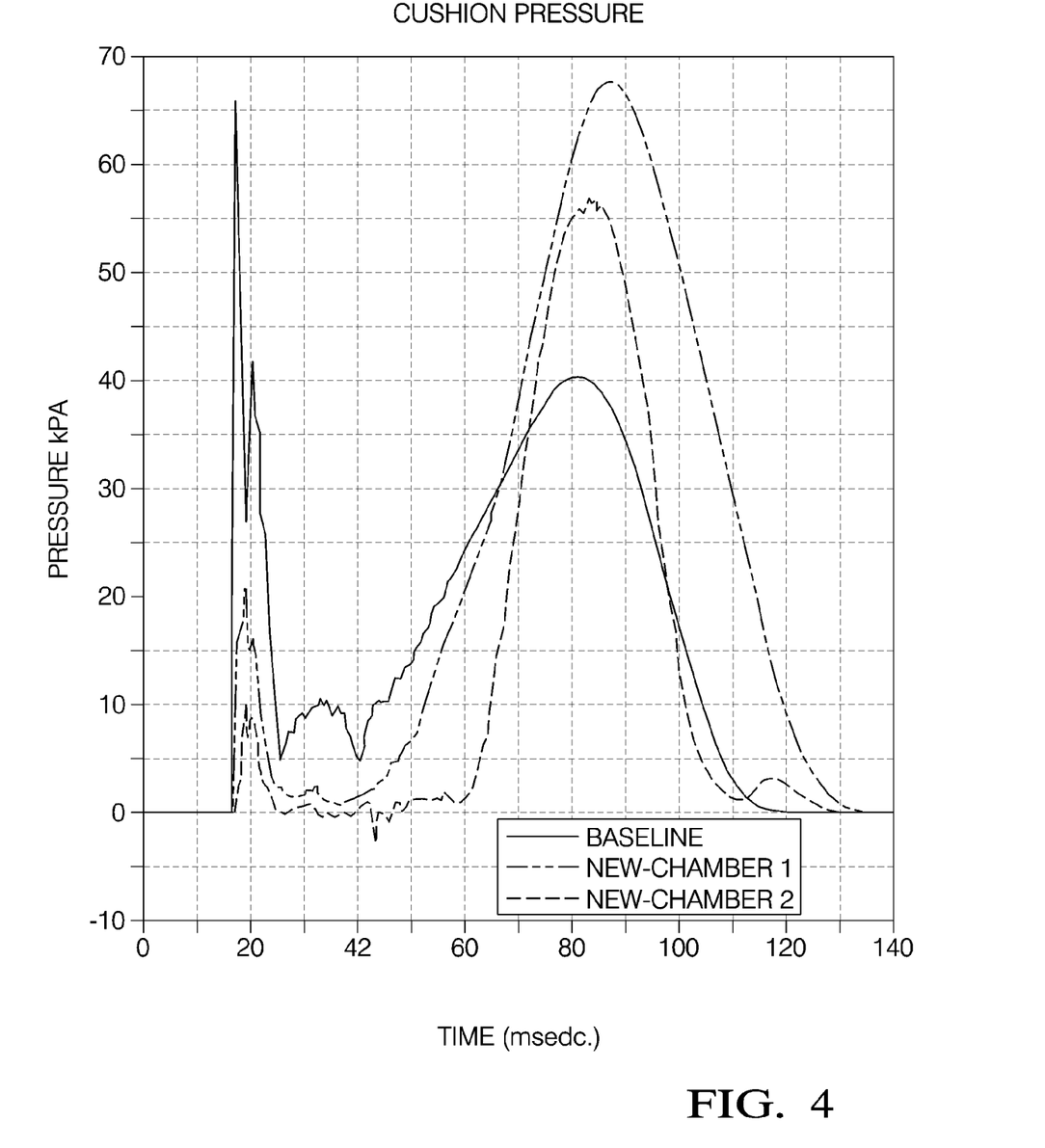
FIG. 4 is a graph illustrating the plots of cushion pressure in the baseline cushion of FIG. 2 and the chambers of the cushion illustrated in FIG. 3 during a deployment event.
Figure 5:
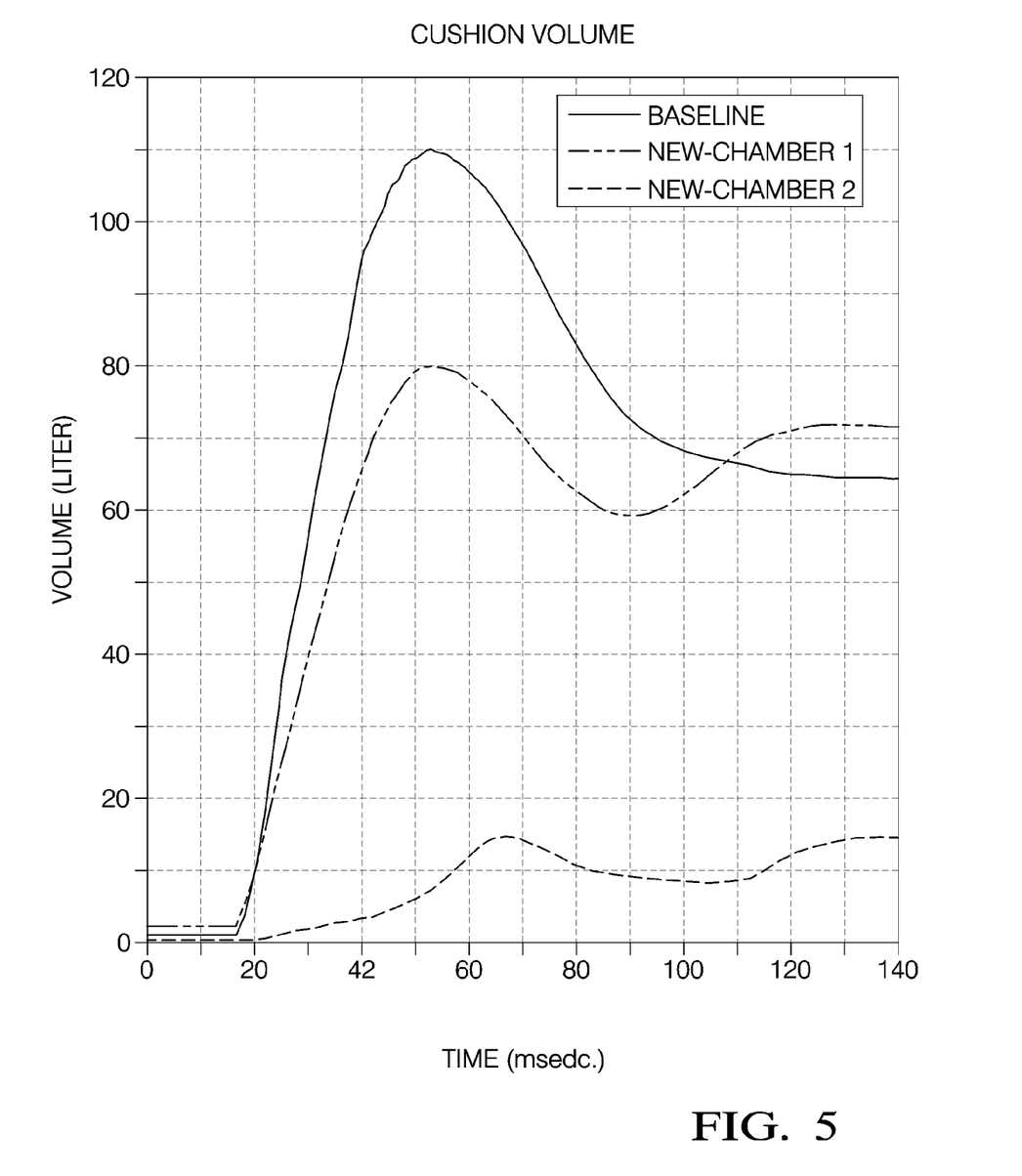
FIG. 5 is a graph illustrating the plots of cushion volumes in the baseline cushion of FIG. 2 and the chambers of the cushion illustrated in FIG. 3 during a deployment event.

For example, FIG. 4 is a graph illustrating the plots of cushion pressure in the baseline cushion of FIG. 2 and the chambers of the cushion illustrated in FIG. 3 during a deployment event wherein the baseline plot is the cushion illustrated in FIG. 2 and the plot of the New Chamber 1 is the primary inflatable cushion chamber and the plot of New Chamber 2 is the secondary inflatable cushion chamber of the inflatable cushion illustrated in FIG. 3. In addition, FIG. 5 is a graph illustrating the plots of cushion volumes in the baseline cushion of FIG. 2 and the chambers of the cushion illustrated in FIG. 3 during a deployment event. In accordance with an exemplary embodiment of the present invention the inflatable cushion of an exemplary embodiment of the present invention achieves full deployment of both chambers while only using approximately 60% of the inflator output required to achieve the plot of the baseline inflatable cushion.

Accordingly and by employing the two chamber design with a means for inflating the second chamber only after a predetermined pressure has been achieved in the primary inflatable cushion chamber an inflatable cushion with approximately 95 liters of volume (both chambers) is fully deployed using 60% of an inflation force required to fully deploy a 115 liter single chamber cushion. This is achieved by limiting fluid flow into the secondary inflatable chamber until a predetermined pressure has been achieved in the primary inflatable chamber as well as occupant interaction with the primary inflatable chamber, which forces the inflation gas from the primary inflatable chamber to the secondary inflatable chamber. Moreover, the peak pressure volumes of the primary inflatable chamber and the secondary inflatable chamber are greater than the peak pressure volume of the baseline cushion and these peak pressure volumes are achieved at approximately the same time from initial activation of the inflator inflating the inflatable cushion.

The secondary inflatable chamber 42 increases in pressure more quickly as the occupant moves forward and displaces the primary inflatable chamber 40. The chamber peak pressure of the primary inflatable chamber 40 and secondary inflatable chamber 42 can vary depending on any one or more of the design considerations described above (e.g. chamber size, vent size, etc.).

In accordance with an exemplary embodiment of the present invention, an exemplary method of restraining a first region and a second region of an occupant 90 in a vehicle is provided. In this exemplary method, sensing-and-diagnostic module 22 detects a threshold event. This causes sensing-and-diagnostic module 22 to generate activation signal 24 to the inflator 18. Next, inflator 18 provides an inflating gas to the primary inflatable chamber 40 to fully inflate or deploy primary inflatable chamber 40 to be in a position to restrain the first region (e.g. chest) of the occupant. Then, the inflating gas from the primary inflatable chamber 40 flows through the portion 48 and into secondary inflatable chamber 42 to fully inflate or deploy secondary inflatable chamber 42 and be in a position to restrain the second region (e.g. head) of the occupant.

During occupant interaction and as the occupant moves against the primary inflatable chamber 40, the secondary inflatable chamber 42 increases in pressure more quickly, thus causing the secondary inflatable chamber 42 to fill faster. Finally, the inflating gas in the primary inflatable chamber leaks through the vents defined by the nylon bag used to form primary inflatable chamber and the gas vents into the vehicle or atmosphere.

Figure 6:
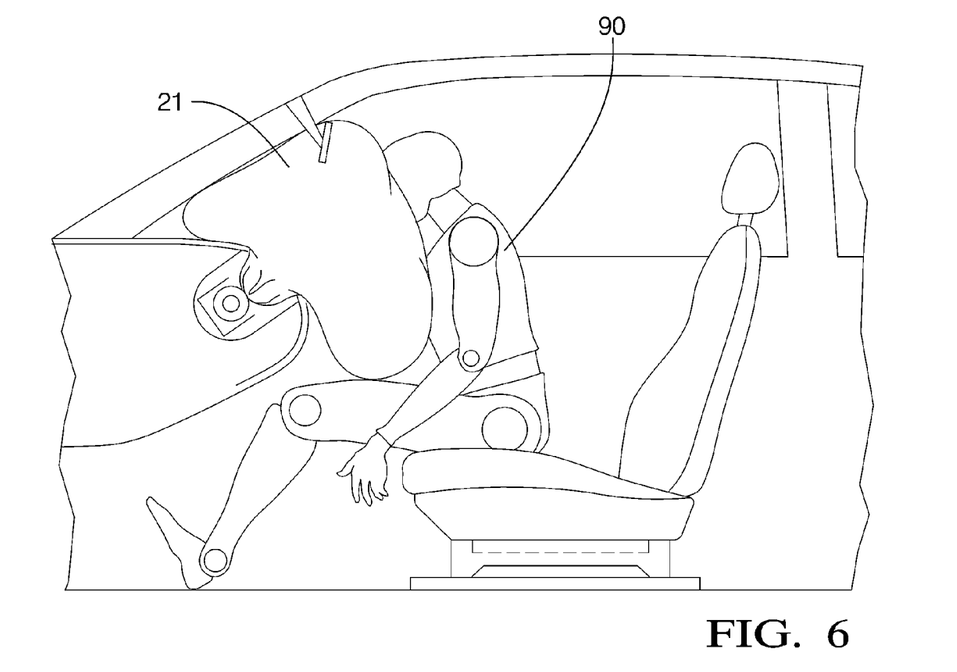
FIG. 6 illustrates an occupant interacting with the baseline cushion of FIG. 2.
Figure 7:
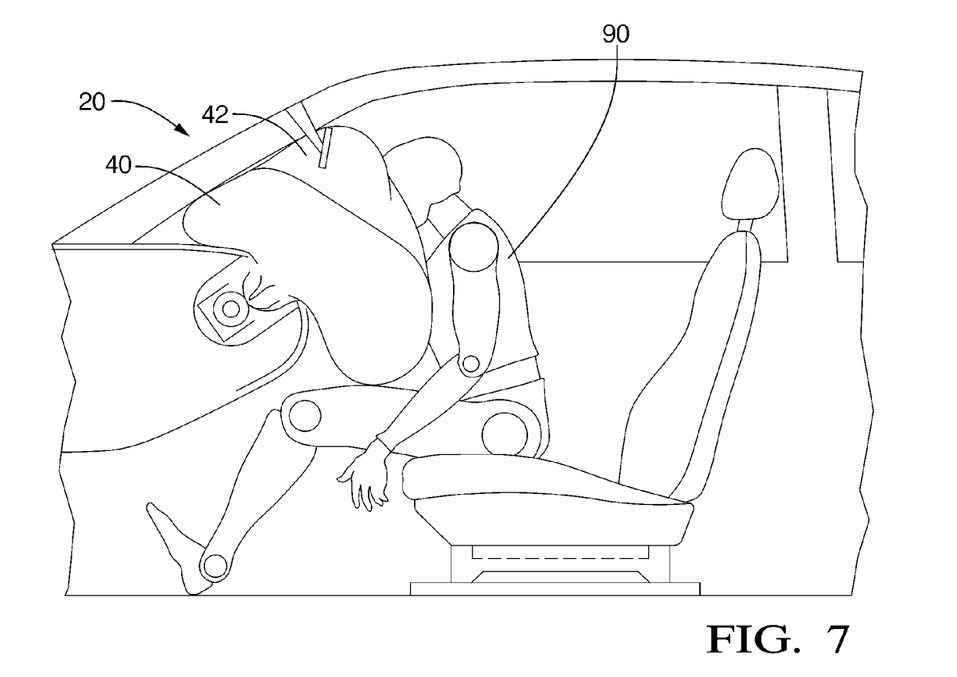
FIG. 7 illustrates an occupant interacting with the multiple chamber cushion of FIG. 3.

For example, FIG. 6 illustrates an occupant interacting with the baseline cushion of FIG. 2 while FIG. 7 illustrates an occupant interacting with the multiple chamber cushion of FIG. 3.

In accordance with an exemplary embodiment of the present invention and for purposes of comparison, the baseline cushion has a total volume of 110 liters while the combined volume of the cushion of an exemplary embodiment has a total volume of 95 liters (80 primary and 15 secondary). Moreover, the pressure in the single chamber of the baseline cushion only reaches 40 KPa at full output while the primary chamber reaches 67 KPa and the secondary reaches 56 KPa at only 60% output of the same inflator. Accordingly, a gas efficient cushion design is provided.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An inflatable cushion for use in an air bag module, comprising:

a primary inflatable chamber configured for deployment from the air bag module, the primary inflatable chamber having an inlet opening for receipt of an inflation gas, the primary inflatable chamber defining a first volume when inflated with the inflation gas; and a secondary inflatable chamber secured to the primary inflation chamber, the secondary inflatable chamber defining a second volume when inflated with the inflation gas, the second volume being less than the first volume, the secondary inflatable chamber receiving the inflation gas from the primary inflation chamber through a portion of the primary inflatable chamber that is surrounded by an inlet opening of the secondary inflatable chamber, the portion of the primary inflatable chamber being configured such that the inflation gas must travel into the primary inflatable chamber and create a first predetermined pressure in the primary chamber prior to the inflation gas passing through the portion and into the secondary inflatable chamber;

wherein the portion of the primary inflatable chamber includes at least one vent configured to prevent fluid flow in a first direction through the vent and into the secondary inflatable chamber until the first predetermined pressure is achieved in the primary inflatable chamber, and wherein once the first predetermined pressure is achieved, the at least one vent opens and provides fluid communication between the primary inflation chamber and the secondary inflation chamber, and wherein the at least one vent comprises a plurality of flaps configured to overlap each other and seal the at least one vent until the first predetermined pressure is achieved in the primary inflatable chamber.

2. The inflatable cushion as in claim 1, wherein the portion of the primary inflatable chamber comprises an uncoated material and exterior surfaces of the primary inflatable chamber not surrounded by the inlet opening of the secondary inflatable chamber comprise a coated material, the coated material being less permeable than the uncoated material.

3. The inflatable cushion as in claim 1, wherein the portion of the primary inflatable chamber comprises an uncoated material and exterior surfaces of the primary inflatable chamber not surrounded by the inlet opening of the secondary inflatable chamber comprise a coated material, the coated material being less permeable than the uncoated material and the portion of the primary inflatable chamber includes at least one vent configured to prevent fluid flow in a first direction through the vent and into the secondary inflatable chamber until the first predetermined pressure is achieved in the primary inflatable chamber, once the first predetermined pressure is achieved, the at least one vent opens and provides fluid communication between the primary inflation chamber and the secondary inflation chamber.

4. The inflatable cushion as in claim 3, wherein the primary inflatable chamber is configured to interact with a chest of an occupant positioned in front of the airbag module and the secondary inflatable chamber is configured to interact with a head of the occupant.

5. The inflatable cushion as in claim 4, wherein the inflatable cushion is configured for use with a passenger side airbag module and the secondary inflatable cushion does not have any vent openings.

6. The inflatable cushion as in claim 1, wherein the first volume is approximately 80 liters and the second volume is approximately 15 liters and the first predetermined pressure is greater than 45 KPa and the first predetermined pressure is achieved using no more than 60% of an output of an inflator required to achieve a peak pressure of approximately 40 KPa in a single chamber inflatable cushion having a volume of approximately 115 liters.

7. The inflatable cushion as in claim 1, wherein the first volume is approximately 80 liters and the second volume is approximately 15 liters and the first predetermined pressure is greater than 45 KPa.

8. The inflatable cushion as in claim 7, wherein the portion of the primary inflatable chamber comprises an uncoated material and exterior surfaces of the primary inflatable chamber not surrounded by the inlet opening of the secondary inflatable chamber comprise a coated material, the coated material being less permeable than the uncoated material.

9. The inflatable cushion as in claim 7, wherein the portion of the primary inflatable chamber includes at least one vent configured to prevent fluid flow in a first direction through the vent and into the secondary inflatable chamber until the first predetermined pressure is achieved in the primary inflatable chamber, once the first predetermined pressure is achieved, the at least one vent opens and provides fluid communication between the primary inflation chamber and the secondary inflation chamber.

10. The inflatable cushion as in claim 7, wherein the first volume is configured to reach a first volume peak pressure greater than 50 KPa and less than 70 KPa during inflation of the inflatable cushion and the secondary inflatable chamber is configured to reach a second chamber peak pressure greater than 50 KPa and less than 60 KPa during inflation of the inflatable cushion.

11. An airbag module, comprising:
a housing portion;
an inflatable cushion for deployment from the housing portion, the inflatable cushion comprising: a primary inflatable chamber configured for deployment from the air bag module, the primary inflatable chamber having an inlet opening for receipt of an inflation gas, the primary inflatable chamber defining a first volume when inflated with the inflation gas; and
a secondary inflatable chamber secured to the primary inflation chamber, the secondary inflatable chamber defining a second volume when inflated with the inflation gas the second volume being less than the first volume, the secondary inflatable chamber receiving the inflation gas from the primary inflation chamber through a portion of the primary inflatable chamber that is surrounded by an inlet opening of the secondary inflatable chamber, the portion of the primary inflatable chamber being configured such that the inflation gas must travel into the primary inflatable chamber and create a first predetermined pressure in the primary chamber prior to the inflation gas passing through the portion and into the secondary inflatable chamber, wherein fluid communication between the primary inflatable chamber and the secondary inflatable chamber is provided by at least one vent disposed in the portion, said vent being configured to open when the first predetermined pressure is achieved in the primary inflation chamber; and
an inflator For providing the inflation gas;
wherein the primary inflatable chamber is formed out of a coated material and the secondary inflatable chamber is formed out of an uncoated material, the coated material being less permeable than the uncoated material, and wherein the at least one vent comprises a plurality of flaps configured to allow fluid flow in a first direction through said vent while limiting fluid flow in a second direction opposite to said first direction, and wherein the primary inflatable chamber is configured to interact with a chest of an occupant positioned in front of the airbag module and the secondary inflatable chamber is configured to interact with a head of the occupant, and wherein the airbag module is a passenger side airbag module.

12. The airbag module as in claim 11, wherein the secondary inflatable cushion does not have any vent openings and the first volume is approximately 80 liters and the second volume is approximately 15 liters and the first volume is configured to reach a first volume peak pressure greater than 50 KPa and less than 70 KPa during inflation of the inflatable cushion and the secondary inflatable chamber is configured to reach a second chamber peak pressure greater than 50 KPa and less than 60 KPa during inflation of the inflatable cushion and the inflator is a single stage inflator.

13. A method for deploying an inflatable cushion of an airbag module, the method comprising the steps of:
inflating a primary inflatable chamber of the inflatable cushion with an inflating gas released from an inflator in fluid communication with the primary inflatable chamber, the primary inflatable chamber defining a first volume when inflated with an inflation gas; and
inflating a secondary inflatable chamber of the inflatable cushion by opening at least one vent in the primary inflatable chamber and venting a portion of the inflation gas in the primary inflatable chamber into the secondary inflatable chamber after the primary inflatable chamber has been inflated to a predetermined pressure, the secondary inflatable chamber defining a second volume when inflated with the inflation gas, the first volume being greater than the second volume, and the at least one vent comprises a plurality of flaps configured to overlap each other and seal the at least one vent until the predetermined pressure is achieved in the primary inflatable chamber.

* * * * *